United States Patent
Pizzi et al.

(10) Patent No.: US 7,788,151 B2
(45) Date of Patent: Aug. 31, 2010

(54) SYSTEMS AND METHODS FOR ACCESSING A SECURE ELECTRONIC ENVIRONMENT WITH A MOBILE DEVICE

(75) Inventors: John E. Pizzi, San Rafael, CA (US); Rodney Aigistorfer, Mill Valley, CA (US)

(73) Assignee: mFoundry, Inc., Sausalito, CA (US)

( * ) Notice: Subject to any disclaimer, the term of this patent is extended or adjusted under 35 U.S.C. 154(b) by 178 days.

(21) Appl. No.: 11/768,139

(22) Filed: Jun. 25, 2007

(65) Prior Publication Data

US 2008/0319887 A1    Dec. 25, 2008

(51) Int. Cl.
*G06Q 40/10* (2006.01)
(52) U.S. Cl. ...................................................... 705/35
(58) Field of Classification Search ................ 705/35
See application file for complete search history.

(56) References Cited

U.S. PATENT DOCUMENTS

2002/0174075 A1* 11/2002 Mirlas et al. .................. 705/78
2003/0212642 A1* 11/2003 Weller et al. .................. 705/67
2007/0094135 A1    4/2007 Moore et al.
2007/0260556 A1* 11/2007 Pousti ........................... 705/75

FOREIGN PATENT DOCUMENTS

WO    WO 2006/094117 A2    9/2006

OTHER PUBLICATIONS

Carol Power WAP Phones set to user in next stage of Net Revolution Jan. 21, 2000 p. 59.*
Federal Financial Institutions Examination Council (FFEIC), "Authentication in an Internet Banking Environment", FFEIC Press Release, Oct. 12, 2005 (http://www.ffiec.gov/press/pr101205.htm).

* cited by examiner

*Primary Examiner*—James P Trammell
*Assistant Examiner*—Abdul Basit
(74) *Attorney, Agent, or Firm*—Stephen M. De Klerk; Sonnenschein, Nath & Rosenthal LLP

(57) ABSTRACT

The invention provides a system and methods for multifactor authentication of a mobile device for access to an electronic account. The mobile device may serve as one factor of a multifactor authentication process. A time based activation code may be generated in order to enroll an electronic account for mobile access.

20 Claims, 14 Drawing Sheets

SYSTEMS AND METHODS FOR ACCESSING A SECURE ELECTRONIC ENVIRONMENT WITH A MOBILE DEVICE

BACKGROUND OF THE INVENTION

1). Field of the Invention

This invention refers to systems and methods for accessing a secure electronic environment with a mobile device.

2). Discussion of Related Art

Many financial institutions, including banks, credit card companies, loan institutions, brokerage houses, utilize electronically based account systems. The systems are typically accessible by account holder. Financial Institutions are under regulatory scrutiny to deploy multi-factor authentication for online banking transactions, and thus may require a multifactor authenticating process to allow user access to electronically access an account.

Multifactor authentication is usually based on three standard ways to authenticate a customer, (1) something the person knows (e.g. a password), (2) something the person has (e.g. a banking card, time based electronic token), and (3) something the person is (e.g., a picture, a fingerprint). For example, a bank may require a personal identification number (PIN), a bank card, and a picture ID in order access a banking account.

Electronic access to accounts typically is not as secure as physical access to an account. This is because electronic account access is usually based on a combination of the first standard above (1) something the person knows. For example access to an online banking account may require a unique user name and a password. This is a dual factor method of authentication, but does include (2) something the customer has or (3) something the customer is. It is easier to steal and use one or more items in one category of authentication, than to steal and use a combination. For example a malicious spyware program may capture both a user name and a password, which may be used on a foreign device for access to the account.

Mobile devices (e.g. cellular phones, PDA's, VoIP wireless handheld devices) are common devices used by consumers. Multifactor authentication using mobile devices is also required to access web based or private network financial systems. Customers using a mobile device wish to have an efficient method of accessing an account. Multifactor authentication is a more cumbersome process for an account user when using a mobile device than in a typical home, office, or bank setting, and thus user's desire ease of use for accessing an account. However account users wish to have a secure method of accessing a financial account, and do not want easy account infiltration by a foreign mobile device.

SUMMARY OF THE INVENTION

The invention provides a computer implemented method to allow access to an account with a mobile device, the method including verifying a customer verification code, the customer verification code being sent by a mobile device, verifying a mobile user identification code of the mobile device, activating a customer number associated with an account, associating the customer number with the mobile device, registering a customer personal identification number entered by a user of the mobile device, and allowing the mobile device to access the account.

The customer verification code may be assigned to the customer account within a specified period of time before verifying the customer verification code.

The customer verification code may expire if the specified period of time has elapsed.

The mobile device may send through a voice or data related network.

The account may be a banking account.

The mobile user identification code may be at least one of, or a combination of a mobile identification code, an electronic serial number, an international mobile equipment identity, a network access identifier, and a phone number.

The invention also provides a machine readable medium containing instructions that, when executed by a data processing system, will cause the system to perform a computer implemented method to initially access an account with a mobile device, the method including verifying a customer verification code, the customer verification code being sent by a mobile device, verifying a mobile identification code of the mobile device, activating a customer number associated with an account, associating the customer number with the mobile device, registering a customer personal identification number entered by a user of the mobile device, and allowing the mobile device to access the account.

The customer verification code may be assigned to the customer account within a specified period of time before verifying the customer verification code.

The customer verification code may expire if the specified period of time has elapsed.

The invention also includes a computer implemented method to access an account with a mobile device, the method including sending a customer verification code, the customer verification code being sent by a mobile device to a secure electronic environment, wherein an account is protected within the secure electronic environment, sending a mobile user identification code of the mobile device to the secure electronic environment, receiving confirmation of the registration of a customer number, wherein the customer number is associated with the account, and sending a customer personal identification number entered by a user of the mobile device to the secure electronic environment to access the account.

The customer verification code may be verified within the secure electronic environment.

The customer verification code may be verified if the customer verification code has been created within a specific amount of time.

The mobile user identification code may be at least one of or a combination of a mobile identification code, an electronic serial number, an international mobile equipment identity, a network access identifier, and a phone number.

The invention also includes a machine readable medium containing instructions that, when executed by a data processing system, will cause the system to perform a computer implemented method to access an account with a mobile device, the method including sending a customer verification code, the customer verification code being sent by a mobile device to a secure electronic environment, wherein an account is protected within the secure electronic environment, sending a mobile identification code of the mobile device to the secure electronic environment; receiving confirmation of the registration of a customer number, wherein the customer number is associated with the account, and sending a customer personal identification number entered by a user of the mobile device to the secure electronic environment to access the account.

The customer verification code may be verified within the secure electronic environment.

The customer verification code may be verified if the customer verification code has been created within a specific amount of time.

The invention also includes a computer implemented method to allow access an account with a verified mobile device; the method including verifying a customer number when a customer signs on to an account with a verified mobile device, the customer number being previously associated with the verified mobile device and the account, verifying a customer personal identification number entered onto the verified mobile device when the customer signs on to the account with the verified mobile device, and allowing the verified mobile device access to the account.

The customer number may be a factor of multifactor authorization.

The personal identification number may be a factor of multifactor authorization.

The customer number may be stored on the customer device and automatically sent by the mobile device.

The invention also includes a machine readable medium containing instructions that, when executed by a data processing system, will cause the system to perform a computer implemented method to allow access an account with a verified mobile device, the method including verifying a customer number when a customer signs on to an account with a verified mobile device, the customer number being previously associated with the verified mobile device and the account; verifying a customer personal identification number entered onto the verified mobile device when the customer signs on to the account with the verified mobile device, and allowing the verified mobile device access to the account.

The customer number may be a factor of multifactor authorization.

The personal identification number may be a second level of authorization.

The invention includes a computer implemented to enroll a mobile device for access to an account, the method including presenting at least one account to a user, generating an activation code for a mobile device, presenting the activation code to the user, and starting a timer, wherein the activation code expires after the timer reaches a predetermined amount of time.

The activation code may be associated with a user profile of the user.

The user profile may include a unique identifier of the mobile device.

BRIEF DESCRIPTION OF THE DRAWINGS

The invention is further described by way of example(s) with reference to the accompanying drawings, wherein.

DETAILED DESCRIPTION OF THE INVENTION

Figure 1:
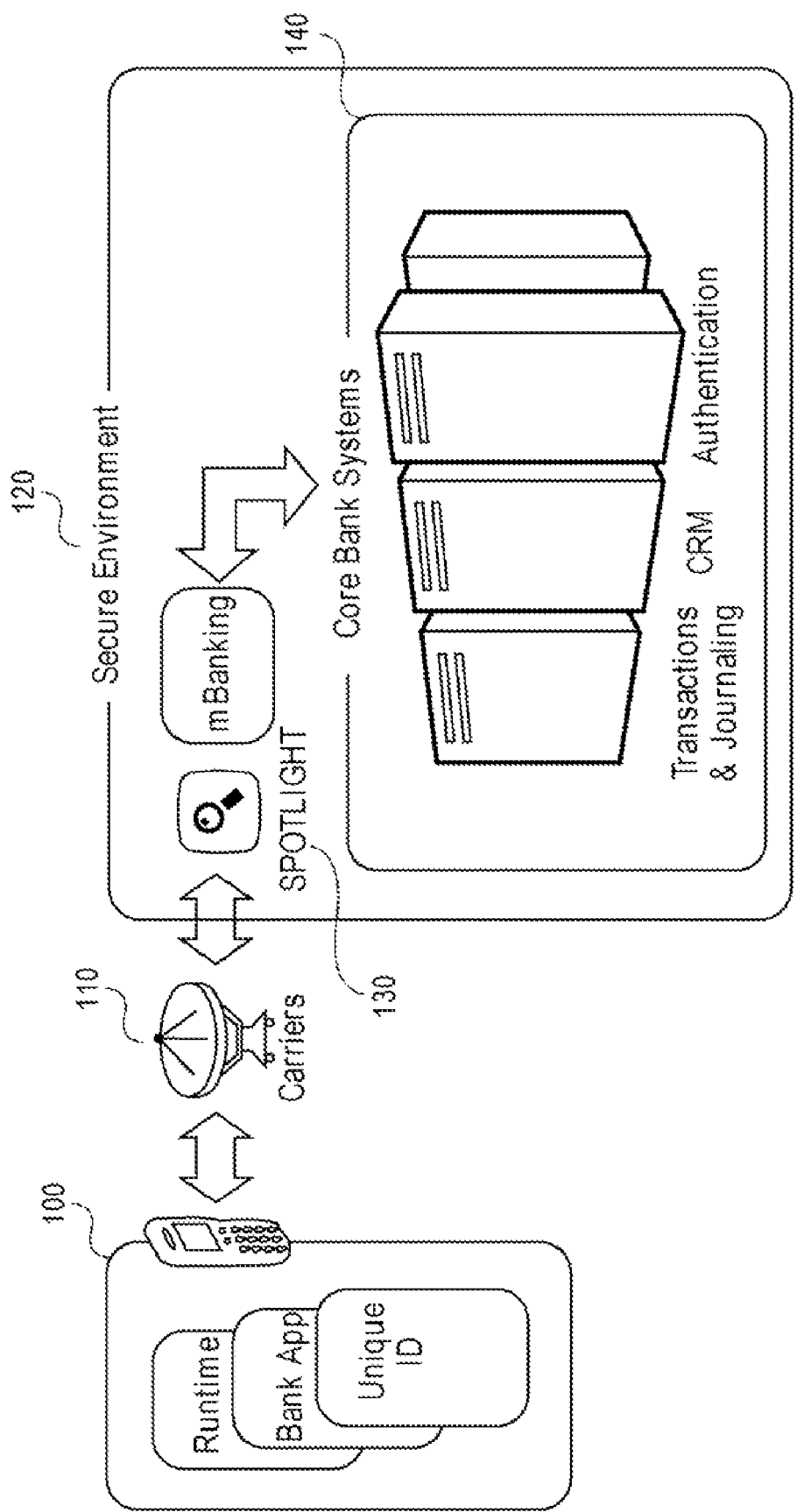
FIG. 1 is high level view of a system for accessing an account in a secure environment with a mobile device.

FIG. 1 of the accompanying drawings illustrates a system for accessing an account in a secure environment with a mobile device. The mobile device 100 communicates with a secure bank environment 120 through wireless carriers 110. The wireless carrier may be a standard voice network (e.g. cellular), satellite based, or a public or private based data network, such as a packet based method of communication such as Voice over Internet Protocol (VoIP), Internet Telephony, Broadband Telephony, and Voice over Broadband. The mobile device 100 includes a mobile software application called a Moblet which interfaces with a compatible banking software application 130 in the secure banking environment. The Moblet is a software application on the mobile device designed to serve as a user interface between a financial institution system and the mobile device. The banking software application 130 communicates and translates between the mobile device 100 and the core bank systems 140. In use the banking software application 130 serves as a messaging interface for the mobile device 100, a security interface for external communication to the core bank systems 140, and communications adapter (e.g. XML, SOAP). The Moblet may operate on a variety of wireless communication protocols (e.g. WAP, HTTP(S), SMS) and device platforms including but not limited to BREW, Windows Mobile, Palm, Symbian, WIPI, and BlackBerry.

Enrolling

Figure 2:
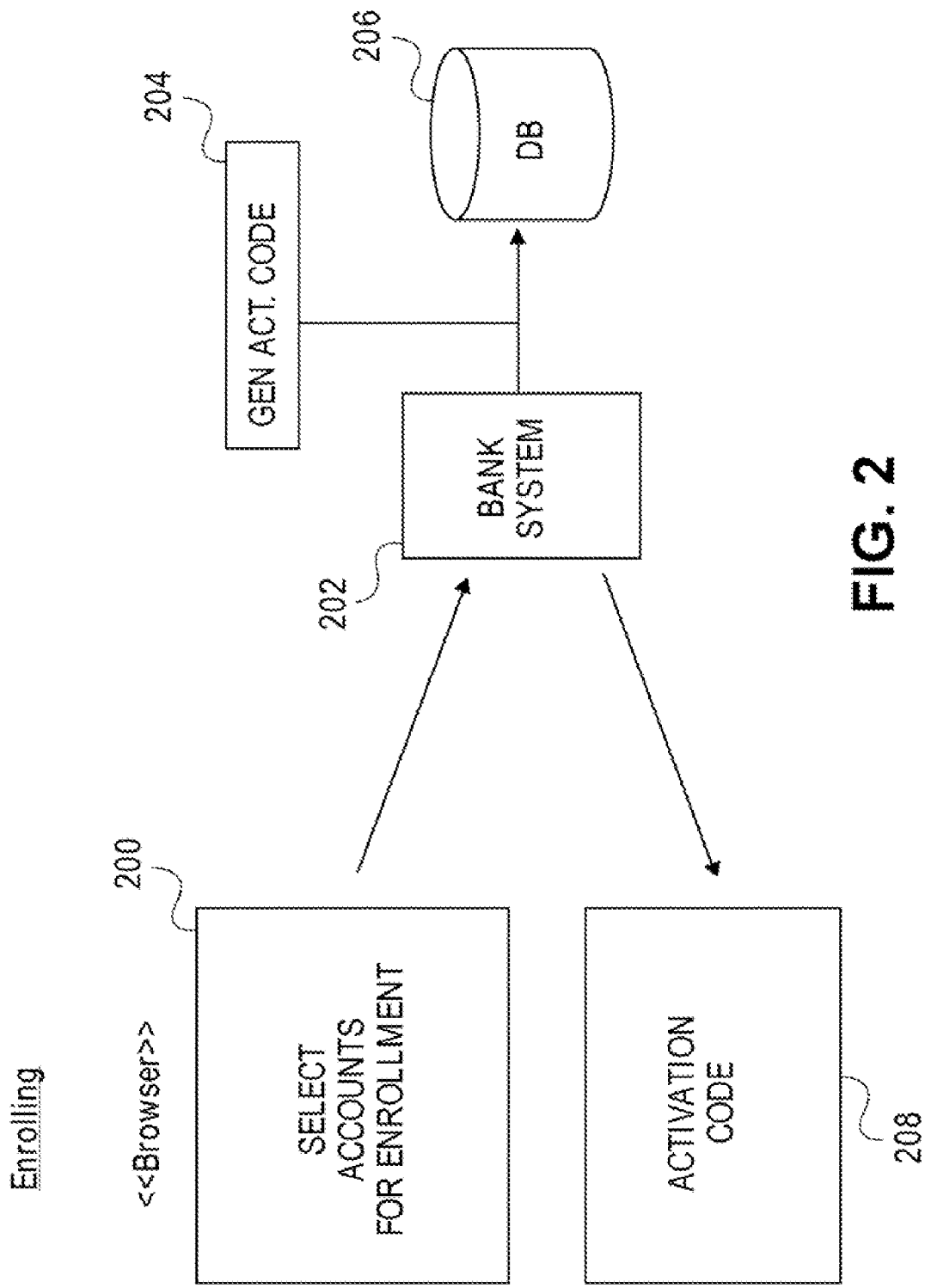
FIG. 2 is a flow chart for enrolling a mobile device to an electronic account located in a secure environment.

FIG. 2 illustrates enrolling a mobile device to an electronic account (e.g. banking account) located in a secure environment. The electronic account requires more than one form of user authentication, or multifactor authentication, in order to allow access by the mobile device to the electronic account. Enrolling the mobile device allows at least one form of authentication to be satisfied.

Before enrolling takes place the user installs the Moblet onto the mobile device. The Moblet is typically tailored to serve specific financial institution's needs (e.g. graphical style, colors, options) but will universally include the ability to interface with a financial institute's institution's electronic account system, and also providing the multifactor authentication required for electronic account access. The Moblet may be supplied from the financial institution or from a wireless carrier.

FIG. 2 shows module 200 for selecting an account for mobile access. Module 200 is performed through a web browser on a separate computer, which may be the website of a financial institution. In module 200 the user selects one or more accounts which the user wishes to have access to by the mobile device. The selection made by the user is forwarded to the financial institution electronic system 202. The system 202 generates an activation code 208 through module 204. The activation code 208 is associated with a user profile on the financial institution's database 206. The activation code 208 is returned to the web browser and presented to the user. When the activation code 208 is created is or alternatively presented to the user, a timer is started. When the timer counts to a predetermined amount of time (e.g. 5 minutes) the activation code 208 expires. The expiration of the activation code 208 after a predetermined amount of time is advantageous as it helps prevent unauthorized use of the activation code.

Multifactor Authentication

Figure 3:
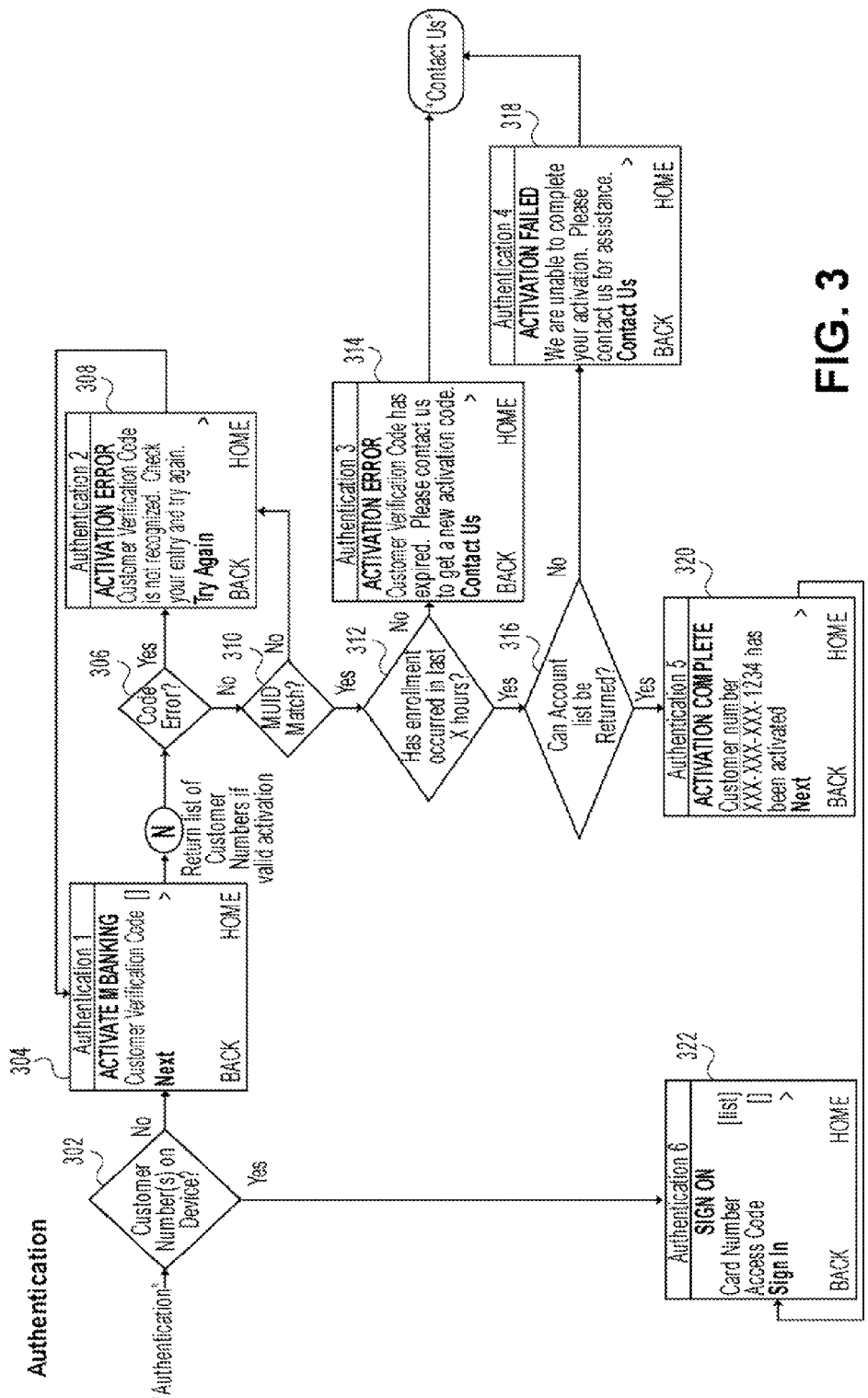
FIG. 3 is a flow chat for a multifactor authentication process to allow a mobile device access to an electronic account located in a secure environment.

FIG. 3 illustrates a multifactor authentication process to allow a mobile device access to an electronic account located in a secure environment. At module 300 user of the mobile device uses the Moblet to access the electronic account. At module 302 the Moblet determines if a customer number corresponding to an electronic account is stored in the mobile device, and thus previously verified. The customer number serves as one factor of the multifactor authentication, as it is stored on the device (e.g. something the customer is). If the customer number is not present on the Moblet then the mobile device proceeds to module 304.

At module 304 the Moblet attempts to activate an electronic account. The Moblet prompts the user to enter the activation code 204. The activation code 204 serves as another factor of the multifactor authentication. The activation code 204 is forwarded to the financial institution in module 306. In module 306 the financial institution checks to see if the activation code was properly issued. If the code is not recognized the Moblet prompts an activation error message as shown in module 308, and the user may optionally return to module 304 for reentry of the activation code 204. In module 304 the Moblet will also prompt the user to specify a personal identification number (PIN) for later access to the account, after the account is authenticated on the mobile device. The PIN is one factor of the multifactor authentication system, (e.g. something the customer knows).

The process proceeds to module 310 for a mobile unit identification match (MUID) to the user profile. The MUID is a unique identifier of the mobile device which matches a mobile device on the user profile. The MUID serves as another factor of the multifactor authentication process because it is part of the mobile device (e.g. something the customer has). The use of the MUID also prevents access to the account by a foreign mobile device.

The MUID is typically an alphanumeric string of characters, for example a non-sequential 45 character string generated by a computer algorithm. The MUID is previously installed as part of the Moblet and previously associated with the electronic account. Alternatively, the MUID may also be in the form of already available identifiers which are unique to the mobile device and assigned by other entities such as the mobile device manufacturer or mobile device service provider. Examples include the Mobile Identification Number, the Electronic Serial Number, the international Mobile Equipment Identity, the Network Access Identifier, or the phone number. The MUID may take the form of one of these identifiers or a combination of more than one identifier, for example the phone number combined with the Electronic Serial Number. If the MUID is not properly verified the process returns to module 303 for reentry of the activation code 204. If the MUID is properly verified then the process proceeds to module 312.

In module 312 the financial institution determines whether the activation code 208 has expired. If the activation code 208 has expired then the process proceeds to module 314 where the Moblet displays an activation error message to the user and optionally allows the user to contact the financial institution. If the activation code is still valid, then the process proceeds to module 316.

In module 316 the financial institution does a check to see if an account list of one or more accounts linked to the user profile can be returned. If the list cannot be returned then the process proceeds to module 318 where the Moblet displays an activation error message to the user and optionally allows the user to contact the financial institution. If the list can be returned, then the process proceeds to module 320.

In module 320 the Moblet retrieves the customer number and stores it on the device, which is typically not fully displayed on the Moblet, for example only the last four digits of the account are shown. The user may then access the account corresponding to the customer number by proceeding to module 322. In module 322 the user selects the account for desired access, and enters the corresponding PIN created in module 304, and is subsequently allowed access to the account. For subsequent account access alter authentication takes place the process will proceed from module 302 to module 322.

Additionally, the financial institution may require layered security, or more verification beyond what is shown in FIG. 3. Additional verification may be required when the financial institution notices unusual activity from the account (e.g. if the mobile device or account is being used in a foreign country). Forms of layered security may include a one time password, confirmation via voice, SMS, or other software application.

Moblet Examples

Figure 4A:
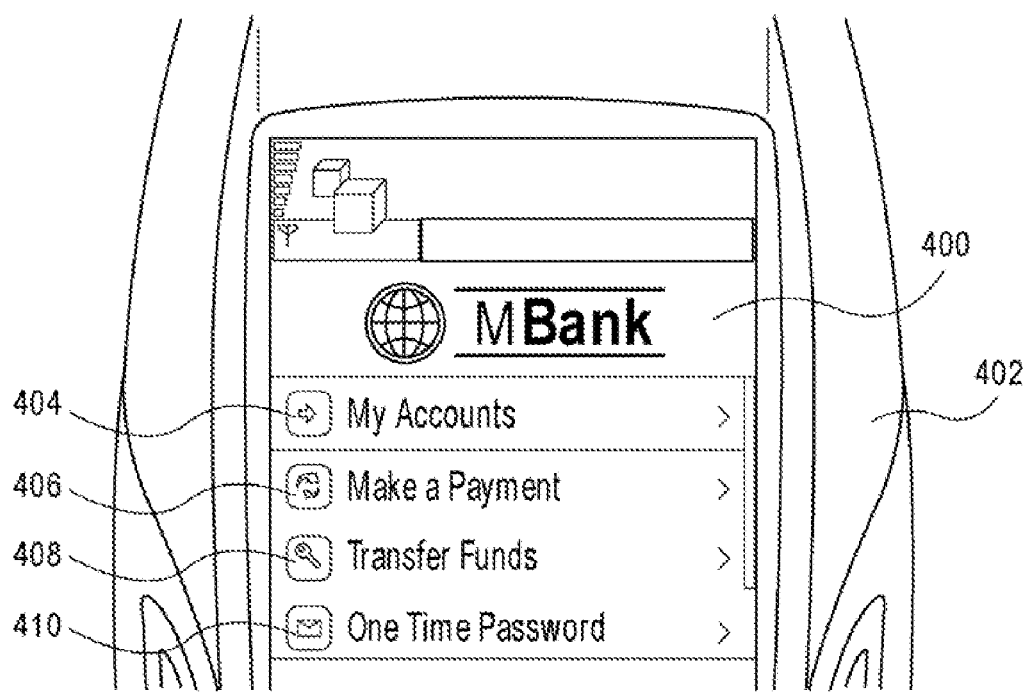
FIGS. 4A-4J are partial front views showing examples of a software application on a mobile device.

FIG. 4A shows a screenshot of a Moblet 400 installed on a mobile device 402. In this example the Moblet is called "MBank" and shows a main screen with options for choosing accounts 404, making payments 406, transfer transferring funds 408, or accessing the password 410. The mobile device user chooses different options by using keys (not shown) on the mobile device 402. This is one example of a Moblet, and more options may be implemented.

Figure 4B:
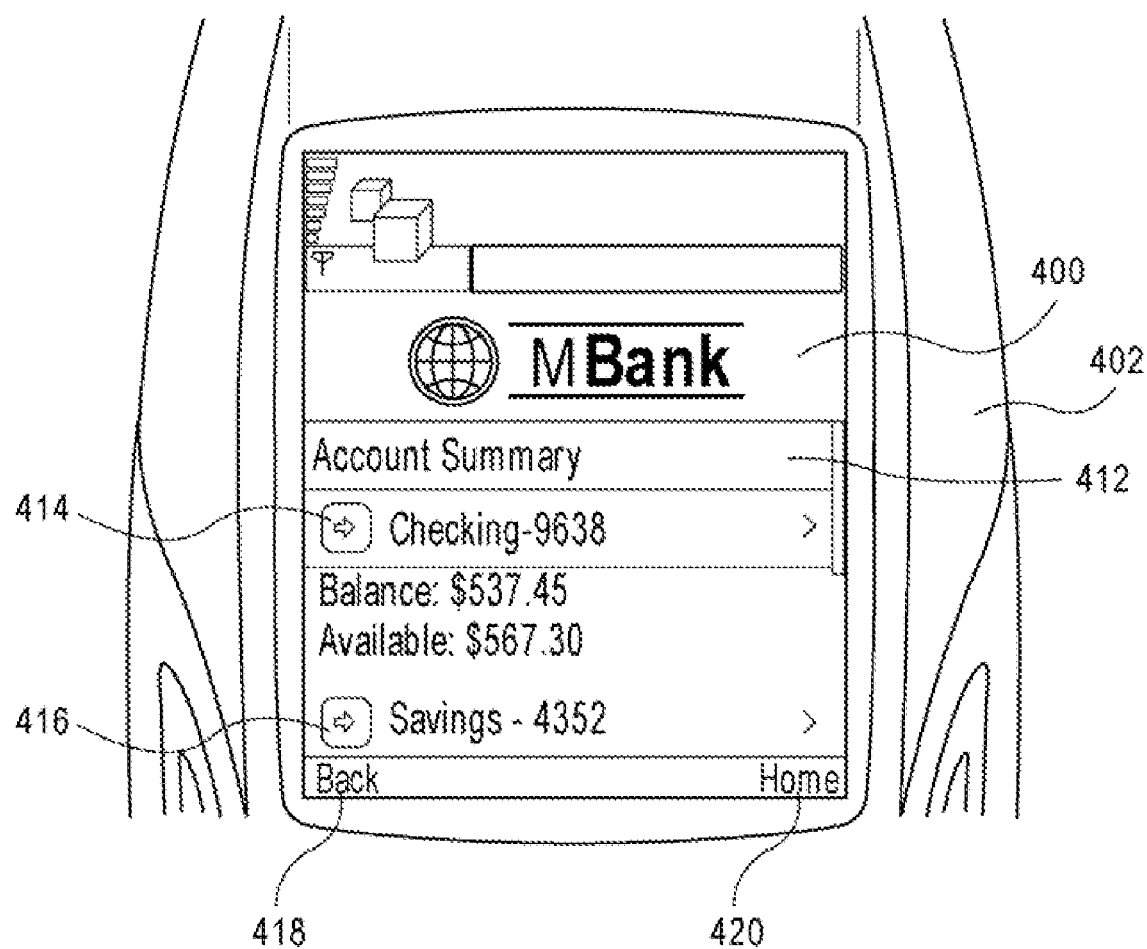

FIG. 4B shows a screenshot of a Moblet 400 installed on a mobile device 402. In this example an account summary 412 is shown. The account summary shows an accessible checking account 414 and savings account 416. The user also changes pages on the Moblet by using the Back 418 and Home 420 functions.

Figure 4C:
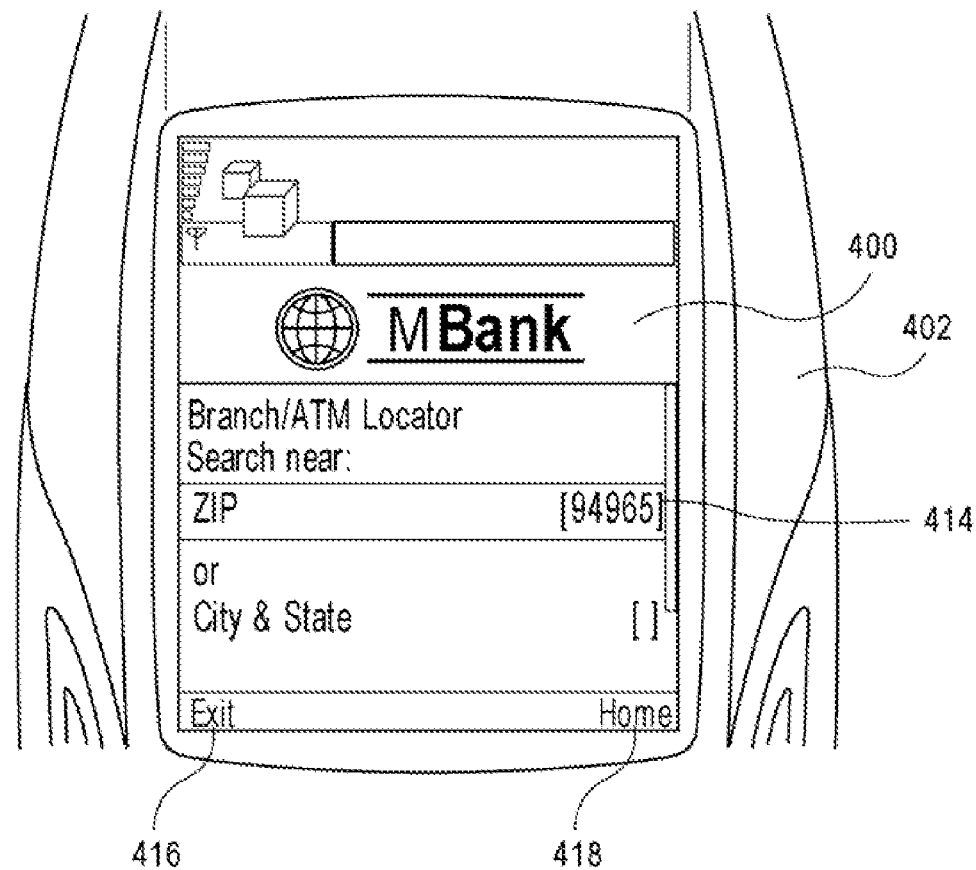

FIG. 4C shows a screenshot of a Moblet 400 installed on a mobile device 402. In this example a financial institution locator 414 is shown. As shown the user enters a zip code or city information to find a financial institution, alternatively a GPS location system may be used. The user may select the Exit 416 or Home 418 functions to exit the screen shown.

Figure 4D:
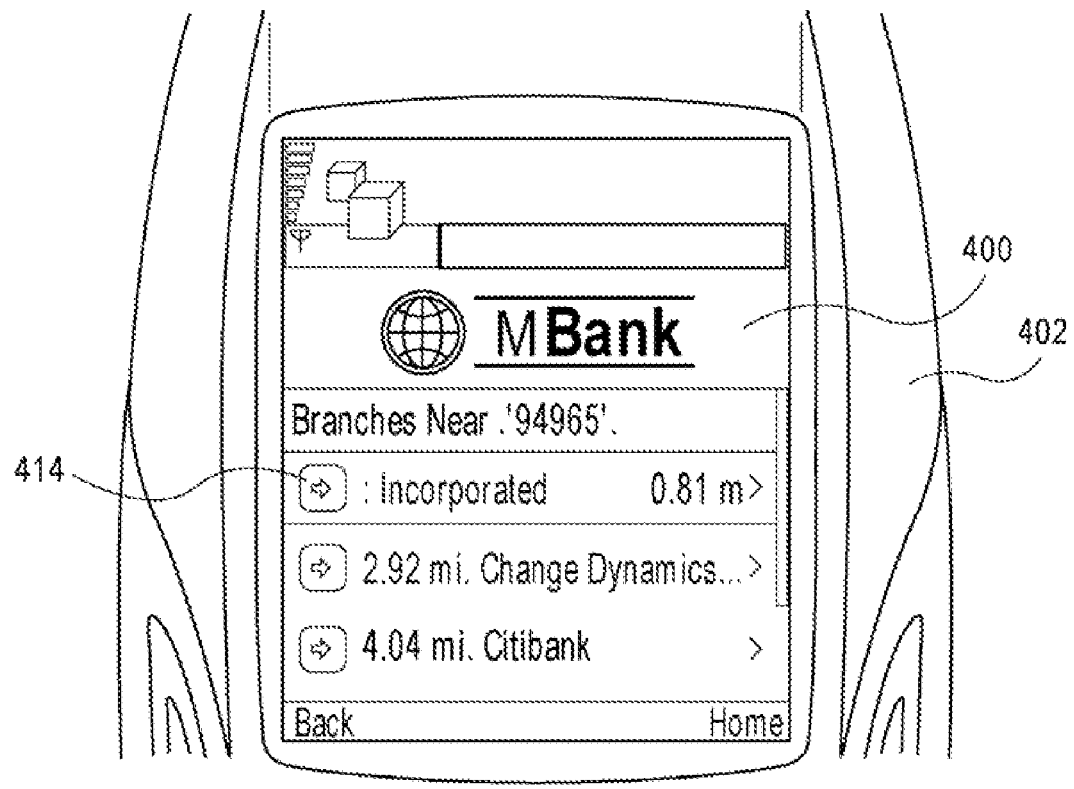

FIG. 4D shows a screenshot of a Moblet 400 installed on a mobile device 402. In this example the financial institution locator 414 is shown. As shown the user has entered an area code on the example show in FIG. 4C, which brought forth a list of nearest financial institutions.

Figure 4E:
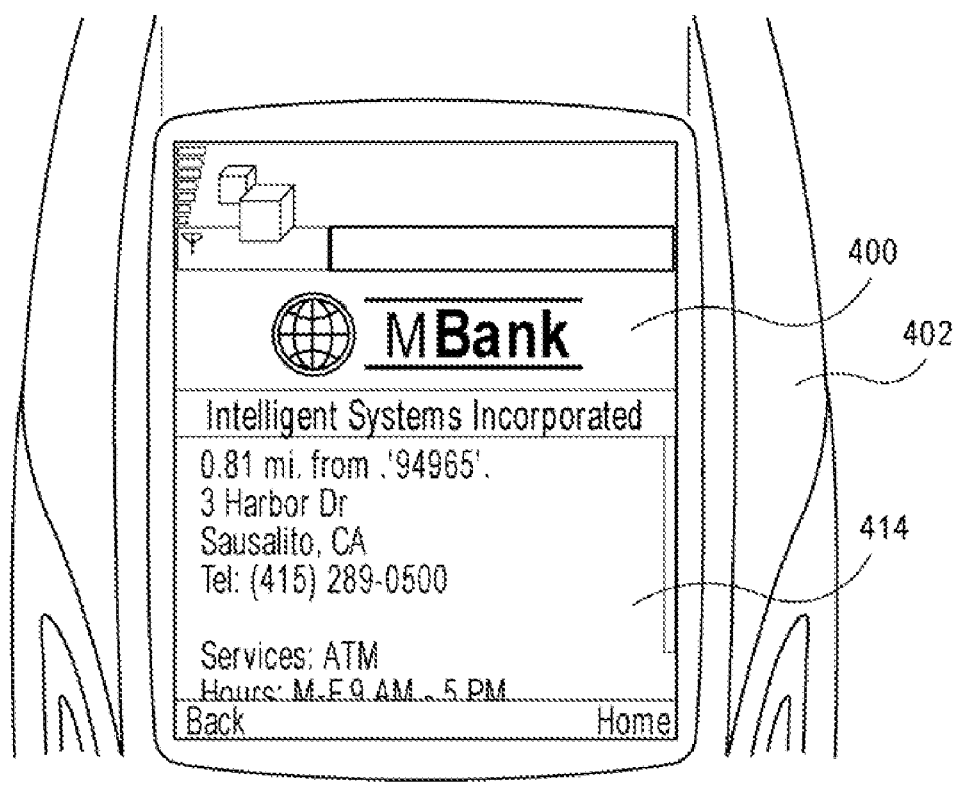

FIG. 4E shows a screenshot of a Moblet 400 installed on a mobile device 402. In this example the financial institution locator 414 is shown. As shown the user has selected a financial institution from the previous screen shown in FIG. 4D, which shows information relating to the financial institution's address, working hours, and contact information.

Figure 4F:
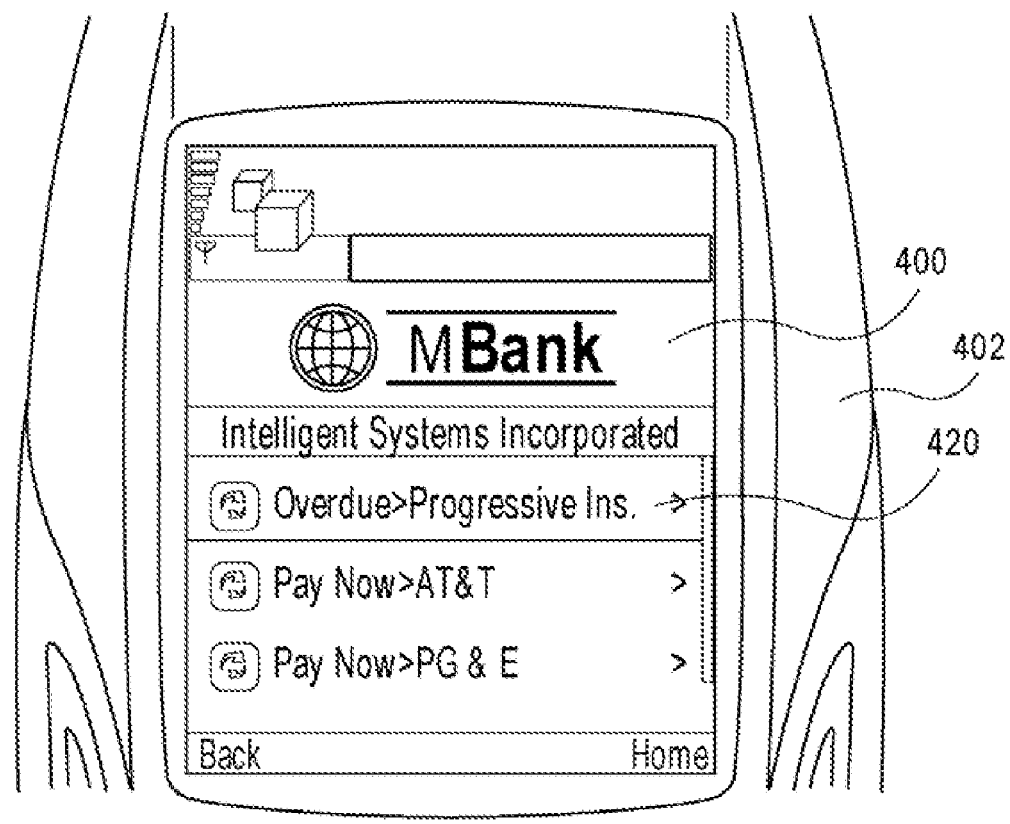
Figure 4G:
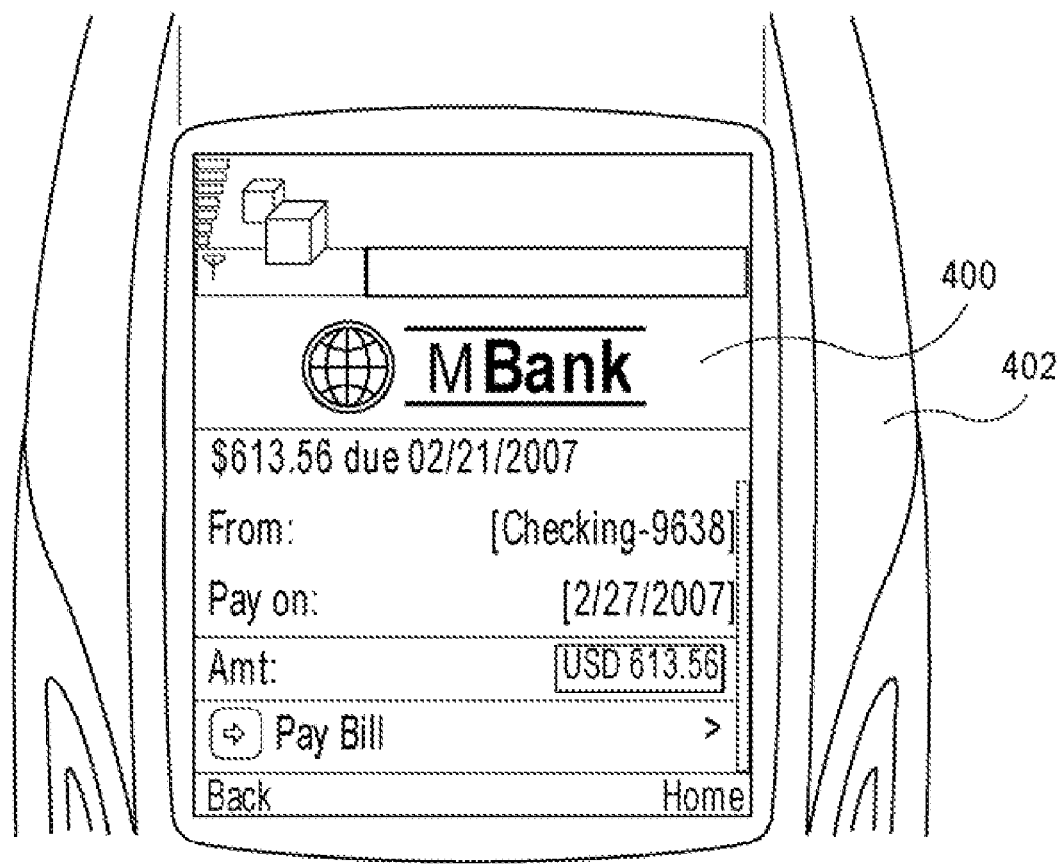
Figure 4H:
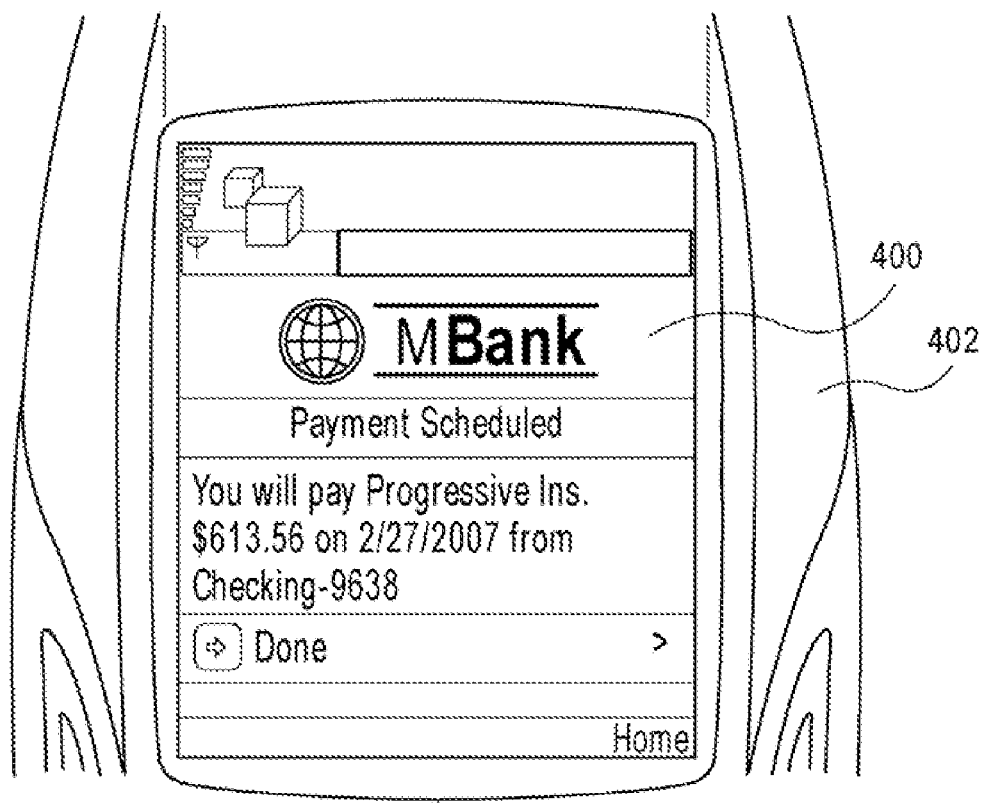

FIG. 4F shows a screenshot of a Moblet 400 installed on a mobile device 402. In this example the user uses the Moblet 400 to make a billpayment. The Moblet shows a listing of several payees, each payee selectable by the user to forward a payment. As shown the Moblet indicates an overdue bill 420. FIG. 4G shows a screen after the user selected the overdue bill 410 on the screen in FIG. 4F. In the example shown the user may enter, schedule and confirm a payment amount. FIG. 4H shows a confirmation of the scheduled payment.

Figure 4I:
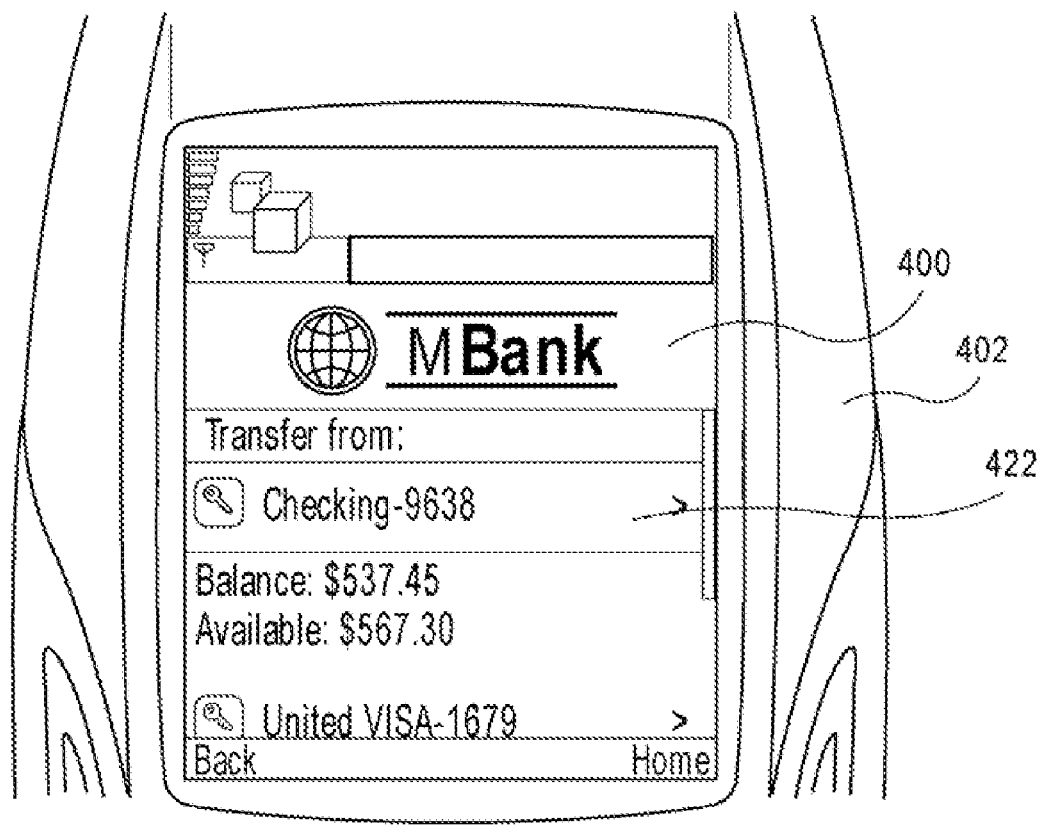
Figure 4J:
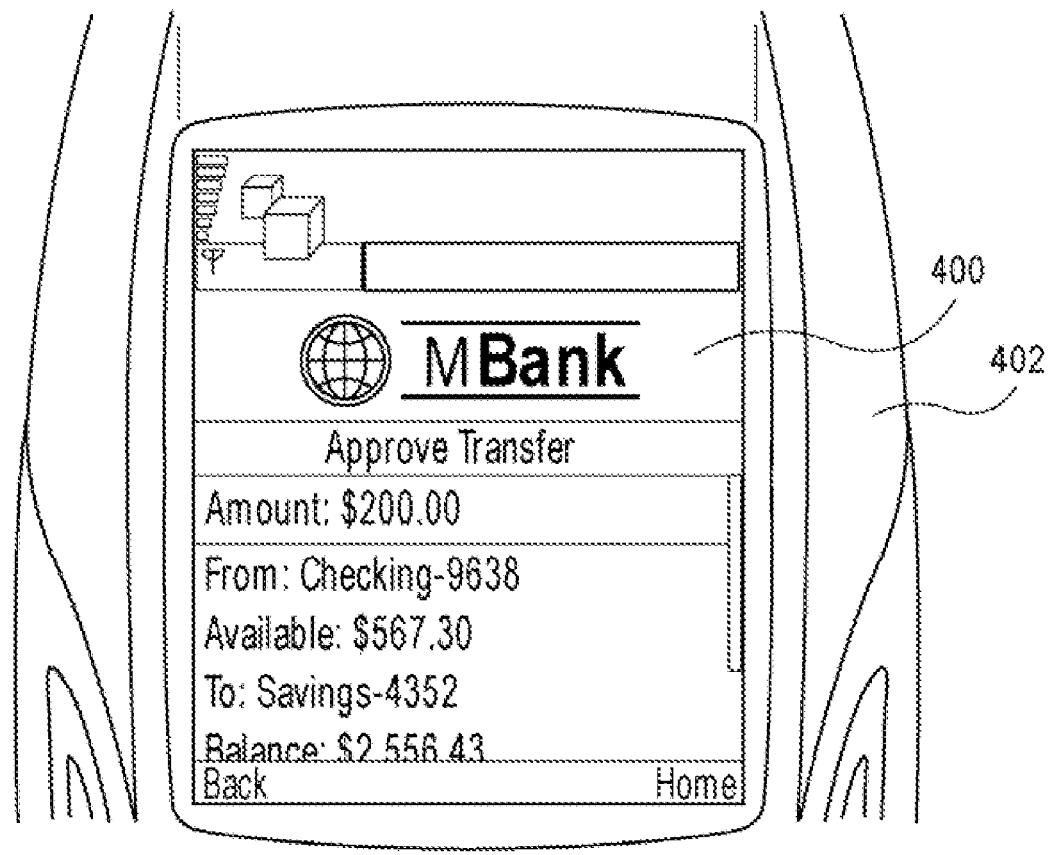

FIG. 4I shows a screenshot of a Moblet 400 installed on a mobile device 402. In this example the user uses the Moblet 400 to transfer funds from one financial account 412 to another. FIG. 4J shows the approval screen after the user has selected a financial account 412 to transfer from and to, and entered the amount of funds to transfer.

Figure 5:
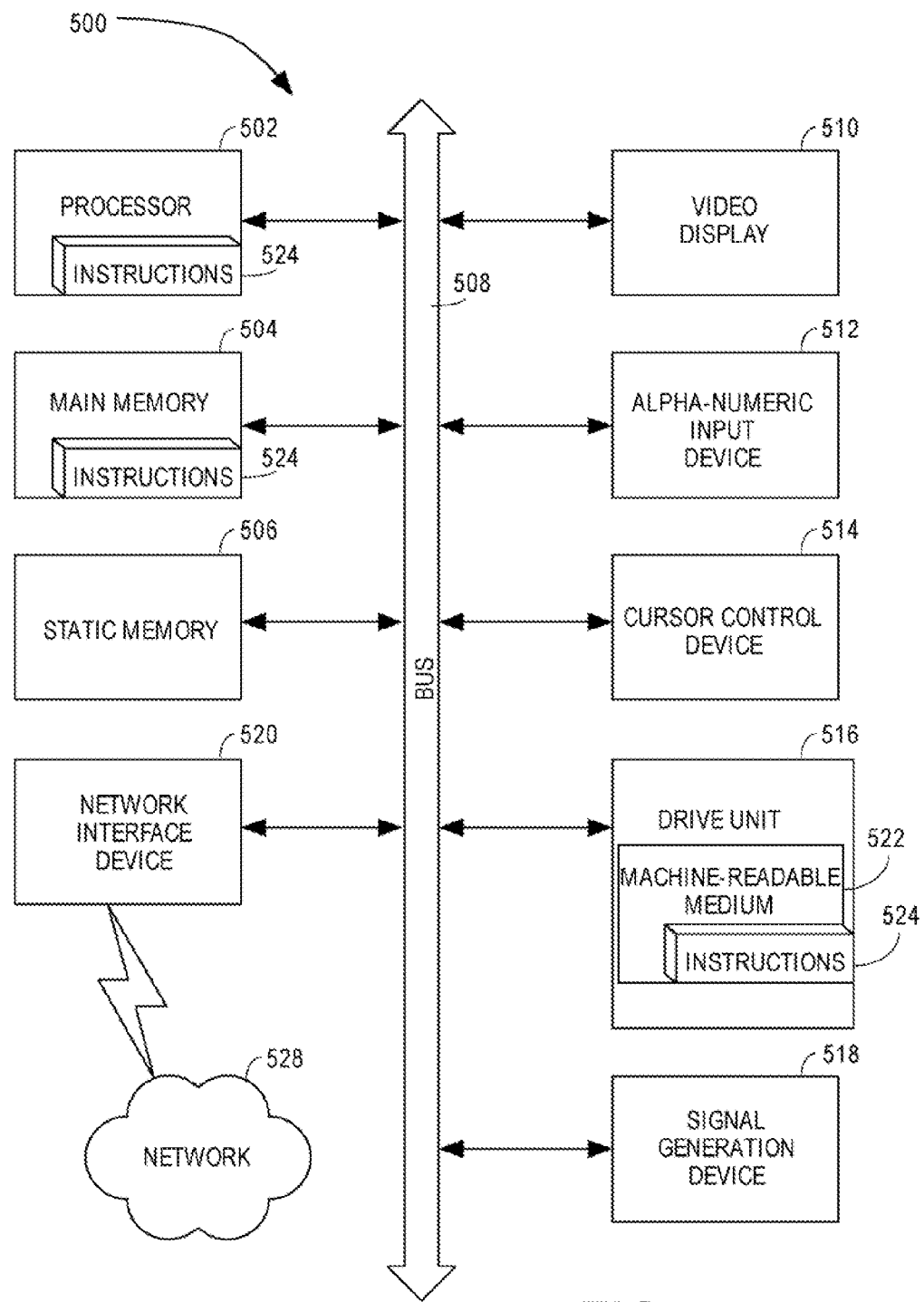
FIG. 5 is a block diagram of an exemplary computer system.

FIG. 5 of the accompanying drawings illustrates an exemplary computer system 500, also known as a data processing system. The operations, processes, modules, methods, and systems described and shown in the accompanying figures of this disclosure are intended to operate on one or more exemplary computer systems 500 as sets of instructions (e.g. software), also known as computer implemented methods. The exemplary computer system 500 is generally representative of personal or client computers, mobile devices (e.g. mobile cellular device, PDA, satellite phone, mobile VoIP device), and servers. The exemplary computer system 500 includes at least one processor 502 (e.g., a Central Processing Unit (CPU), a Graphics Processing Unit (GPU) or both), a main memory 504 (e.g., Read Only Memory (ROM), flash memory, Dynamic Random Access Memory (DRAM) such as Synchronous DRAM (SDRAM) or Rambus DRAM (RDRAM), etc.), and a static memory 506 (e.g., flash memory, Static Random Access Memory (SRAM), etc.), which communicate with each other via a bus 508.

The computer system 500 may further include a video display 510 (e.g. Liquid Crystal Display (LCD) or a Cathode Ray Tube (CRT) or a touch screen). The computer system 500 also includes an alphanumeric input device 512 (e.g., a keyboard, phone pad, touch screen), a cursor control device 514 (e.g., a mouse), a disk drive unit 516, a signal generation device 518 (e.g. a speaker), and a network interface device 520. The network interface device will at least be wireless in case of a mobile device, for communicating to a wireless network (e.g. cellular, VoIP). If the computer system 500 functions as a server, the video display 510, input device 512, signal generation device 518, and cursor control device 514 may not be needed. A mobile device will include one or more signal input devices (e.g. a microphone, camera, fingerprint scanner) which is not shown.

The disk drive unit 516 includes a machine-readable medium 522 on which is stored one or more sets of instructions 524 (e.g. software) embodying any one or more methodologies or functions. The software may also reside, completely or at least partially, within the main memory 504 and/or within the processor 502 during execution thereof by the computer system 500, the main memory 504, and the processor 502 also constituting machine-readable media.

The software may further be transmitted or received over a network 528 via the network interface device 520.

While the machine-readable medium 524 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or earning a set of instructions for execution by the machine and that cause the machine to perform one or more methodologies. It should be known that the processes, methods, and modules disclosed herein are intended to be contained as instructions on a machine readable medium.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A computer implemented method, comprising:
   receiving, at a computing system, an indication that a customer seeks to access, using a mobile device of the customer, a banking account of the customer;
   associating, at the computing system, a first mobile user identification (MUID) code with the banking account;
   verifying, at the computing system, a customer verification code, the customer verification code being sent by the mobile device;
   verifying, at the computing system, a second MUID code which uniquely identifies the mobile device, by comparing the second MUID code with the first MUID code previously associated with the banking account;
   associating, at the computing system, a first customer number with the mobile device;
   upon verification of the customer verification code and the second MUID code, (i) sending the first customer number from the computing system to the mobile device, and (ii) activating, at the computing system, the first customer number associated with the banking account;
   registering, at the computing system, a first customer personal identification number, the first customer personal identification number entered by the customer; and
   allowing, at the computing system, the mobile device to access the banking account.

2. The computer implemented method as in claim 1, wherein the customer verification code is assigned to the banking account within a specified period of time before verifying the customer verification code.

3. The computer implemented method as in claim 2, wherein the customer verification code expires if the specified period of time has elapsed.

4. The computer implemented method as in claim 1, wherein the mobile device sends the customer verification code through a mobile or data related network.

5. The computer implemented method of claim 1 wherein the second MUID code is at least one of, or a combination of a mobile identification code, an electronic serial number, an international mobile equipment identity, a network access identifier, and a phone number.

6. A machine readable storage medium containing instructions that, when executed by a data processing system, will cause the system to perform a computer implemented method, the method comprising:
   receiving, at a data processing system, an indication that a customer seeks to access, using a mobile device of the customer, a banking account of the customer;
   associating, at the data processing system, a first mobile user identification (MUID) code with the banking account;
   verifying, at the data processing system, a customer verification code, the customer verification code being sent by the mobile device;
   verifying, at the data processing system, a second MUID code which uniquely identifies the mobile device, by comparing the second MUID code with the first MUID code previously associated with the banking account;
   associating, at the data processing system, a first customer number with the mobile device;
   upon verification of the customer verification code and the second MUID code, (i) sending the first customer number from the data processing system to the mobile device, and (ii) activating, at the data processing system, the first customer number associated with the banking account;
   registering, at the data processing system, a first customer personal identification number, the first customer personal identification number entered by the customer; and
   allowing, at the data processing system, the mobile device to access the banking account.

7. The machine readable storage medium as in claim 6, wherein the customer verification code is assigned to the banking account within a specified period of time before verifying the customer verification code.

8. The machine readable storage medium as in claim 7, wherein the customer verification code expires if the specified period of time has elapsed.

9. A computer implemented method, comprising:
   sending an indication that a customer seeks to access, using a mobile device of the customer, a banking account of the customer;

sending a customer verification code, the customer verification code being sent by the mobile device to a secure electronic environment, wherein the banking account is protected within the secure electronic environment;

sending a first mobile user identification (MUID) code, the first MUID code uniquely identifying the mobile device and sent by the mobile device to the secure electronic environment so as to allow verification of the first MUID code in the secure electronic environment, the verification by comparing the first MUID code with a second MUID code associated with the banking account;

upon verifying the customer verification code and the first MUID code in the secure electronic environment, receiving, at the mobile device, (i) confirmation of an activation of a customer number at the mobile device and (ii) the customer number, wherein the customer number is associated with the banking account;

storing the customer number at the mobile device; and sending a customer personal identification number from the mobile device to the secure electronic environment, the customer personal identification number entered by a the customer to access the banking account.

10. The computer implemented method as in claim 9 wherein the customer verification code is verified if the customer verification code has been created within a specific amount of time.

11. The computer implemented method of claim 9 wherein the first MUID code is at least one of or a combination of a mobile identification code, an electronic serial number, an international mobile equipment identity, a network access identifier, and a phone number.

12. A machine readable storage medium containing instructions that, when executed by a data processing system, will cause the system to perform a computer implemented method, the method comprising:

sending an indication that a customer seeks to access, using a mobile device of the customer, a banking account of the customer;

sending a customer verification code, the customer verification code being sent by the mobile device to a secure electronic environment, wherein the banking account is protected within the secure electronic environment;

sending a first mobile user identification (MUID) code, the first MUID code uniquely identifying the mobile device and sent by the mobile device to the secure electronic environment so as to allow verification of the first MUID code in the secure electronic environment, the verification by comparing the first MUID code with a second MUID code associated with the banking account;

upon verifying the customer verification code and the first MUID code in the secure electronic environment, receiving, at the mobile device, (i) confirmation of an activation of a customer number at the mobile device and (ii) the customer number, wherein the customer number is associated with the banking account;

storing the customer number at the mobile device; and sending a customer personal identification number from the mobile device to the secure electronic environment, the customer personal identification number entered by the customer to access the banking account.

13. The machine readable storage medium as in claim 12 wherein the customer verification code is verified if the customer verification code has been created within a specific amount of time.

14. The computer implemented method as in claim 1, further comprising:

verifying, at the computing system, a second customer number by comparing the second customer number with the first customer number previously associated with the mobile device and the banking account, the second customer number sent by the mobile device when the customer signs on to the banking account with the mobile device;

verifying, at the computing system, a second customer personal identification number by comparing the second customer personal identification number with the first customer personal identification number registered at the computing system, the second customer personal identification number entered onto the mobile device when the customer signs on to the banking account with the mobile device.

15. The computer implemented method as in claim 14 wherein the second customer number is a factor of multifactor authorization.

16. The computer implemented method as in claim 14 wherein the second customer personal identification number is a factor of multifactor authorization.

17. The computer implemented method as in claim 14 wherein the second customer number is stored on the mobile device and automatically sent by the mobile device.

18. The machine readable storage medium as in claim 6, further comprising:

verifying, at the data processing system, a second customer number by comparing the second customer number with the first customer number previously associated with the mobile device and the banking account, the second customer number sent by the mobile device when the customer signs on to the banking account with the mobile device;

verifying, at the data processing system, a second customer personal identification number by comparing the second customer personal identification number with the first customer personal identification number registered at the data processing system, the second customer personal identification number entered onto the mobile device when the user customer signs on to the banking account with the mobile device.

19. The machine readable storage medium as in claim 18 wherein the second customer number is a factor of multifactor authorization.

20. The machine readable storage medium as in claim 18 wherein the second customer personal identification number is a factor of multifactor authorization.

* * * * *